July 29, 1958  J. S. HERR  2,845,255
MIXING APPARATUS FOR FEEDS AND THE LIKE
Filed April 3, 1956
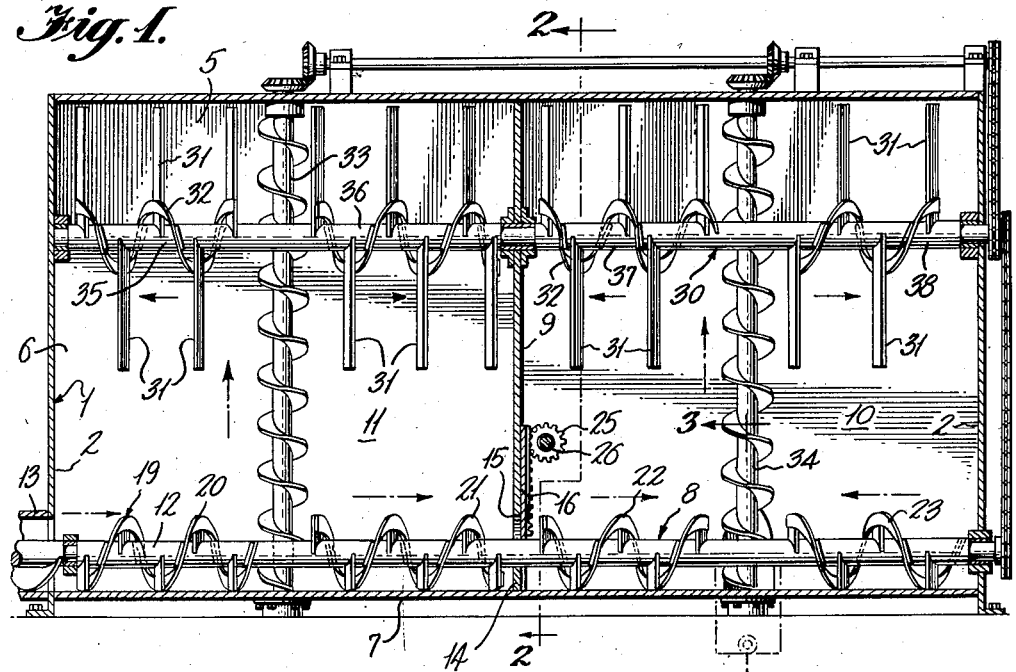
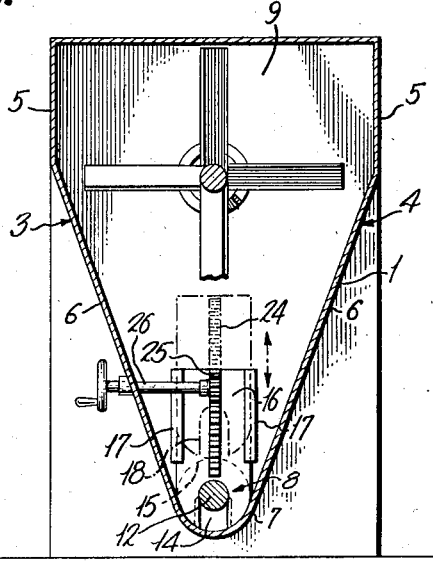
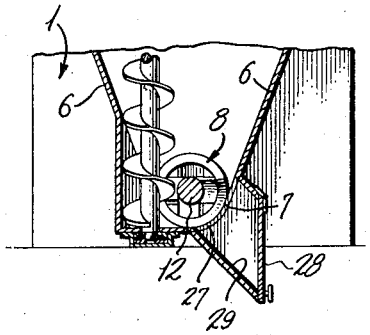
INVENTOR
*Joseph S. Herr*
BY
*Mason, Fenwick & Lawrence*
ATTORNEYS 20# United States Patent Office 2,845,255
Patented July 29, 1958

2,845,255

MIXING APPARATUS FOR FEEDS AND THE LIKE

Joseph Stanley Herr, Nottingham, Pa.

Application April 3, 1956, Serial No. 575,889

4 Claims. (Cl. 259—6)

This invention relates to feed mixing apparatus and is an improvement upon the apparatus described and covered in my Patents No. 2,546,747, dated March 27, 1951, and No. 2,576,177, dated November 27, 1951. The earlier of said patents discloses the combination of a hammermill for comminuting the solids ingredients of the feed, molasses storing, heating, pumping, and spraying means, a mixer and conveyor means for bringing the comminuted solids ingredients to a molasses spraying station and forwarding the solid and liquid ingredients thus brought together, to the mixer. The later issued patent discloses specifically the mixer employed in the combination which comprises a casing having parallel opposite vertical end walls, and opposite side walls joined to said end walls having vertical upper portions and portions convergent downwardly from the lower ends of said vertical portions terminating in a curved bottom which forms a trough cooperating with a horizontal screw conveyor to form a housing for the lower part thereof. Adjacent the middle of the horizontal conveyor is a vertical conveyor having no housing and pitched to move material upwardly. The vanes of the horizontal conveyor are formed in two sections reversely twisted so as to convey the feed ingredients from both ends of the horizontal conveyor to the foot of the vertical conveyor. One end of the horizontal conveyor extends outwardly beyond the mixer to the source of ingredients, and feeds said ingredients together into the mixer.

After enough material has been taken in to establish a definite pattern of mixing, this pattern may be described as follows. Feed conveyed by both sections of the horizontal screw is deposited at the foot of the vertical conveyor, carried up a short distance by said vertical conveyor, but since the latter has no surrounding housing the material being carried soon spills out, forming a mound about the lower part of the vertical conveyor, said mound functioning as a housing for the vertical conveyor which progressively deepens, surrounding more and more of the conveyor. Presently the height of the mound is such that it may reach substantially to the top of the verical conveyor while its angle of repose is such that its base extends to cover the horizontal conveyor for its full length within the mixer. The upper part of the mound is in the path of horizontal beaters having the form of pitched blades radially extending from a horizontal shaft, the beaters at the opposite sides of said vertical conveyor being oppositely pitched in such direction as to move material outward, that is, toward the ends of the casing. Thus, the ingredients brought in by the horizontal conveyor are subjected to circulation in two closed flow paths, having a common limb in the vertical conveyor, the flow in one path being clockwise and in the other path counterclockwise. These circuits are followed repetitively until the desired intimacy of mixing has been achieved. It is readily appreciated that mixing results from the entrainment and interchange of material in the region of the interface between material carried by the horizontal conveyor and adjacent material in the superposed mound, also between material passing upward in the vertical conveyor and the adjacent material in the surrounding mound. Furthermore, the beaters penetrate deeply into the mound of material built about the vertical conveyor and enhance the mixing action, both pushing the material outward toward the ends of the mixer and by combing through the mass in planes perpendicular to the plane of movement of the flow paths.

In my patented mixer the discharge chute taps the casing adjacent the horizontal conveyor at the point of discontinuity of the oppositely pitched sections so that the contents of the mixer are brought to the discharge opening by both sections of the conveyor in order to enable the entire contents of the mixer to be discharged. It will be appreciated, however, that the section of the conveyor adjacent the intake opening of the mixer carries, along with the mixed feed, a fraction of newly admitted unmixed ingredients which would be delivered to the bags at the point of discharge, together with the mixed feed, unless some means were provided to prevent the unmixed ingredients from entering the mixer while finished feed is being discharged therefrom. The obvious thing to do would be to stop the operation of the hammermill and molasses spray while feed is being bagged. This, however, would be impractical not only on account of operational difficulties such as being able to maintain the viscosity of the molasses spray uniform, but also as resulting in inordinate loss of time, since after the contents of the mixer have been exhausted no more bagging could take place until a fresh batch of feed has been admitted to the mixer and thoroughly mixed.

The object of the present invention is to improve the mixer disclosed in my hereinbefore mentioned patents through a construction which enables the entire mixing apparatus to be operated continuously, including the period in which mixed feed is being bagged.

A more specifically stated object of the invention is to modify the structure of my patented mixer by providing an ante-mixing chamber to which the feed ingredients are initially admitted, from which they immediately pass into the mixing chamber of my patented apparatus providing that no feed from said mixing chamber is at the time being discharged, and in which ante-chamber the incoming ingredients are detained and mixed while mixture is being discharged from the mixing chamber of the patented apparatus. The ante-mixing chamber may be a substantial duplicate of the mixing chamber disclosed in the patents, which for convenience will hereinafter be called the main mixing chamber, except that both sections of the horizontal bottom conveyor are pitched in a direction to feed toward the main mixing chamber instead of being pitched in opposite directions, as in the main mixing chamber.

Other objects of the invention will appear as the following description of a practical embodiment of the invention proceeds.

In the drawing which accompanies and forms a part of the following specification, and in which similar reference characters have been employed throughout to designate identical parts:

Figure 1 is a vertical horizontal sectional view of a mixer embodying the principles of the present invention;

Figure 2 is a fragmentary vertical transverse section, taken along the line 2—2 of Figure 1;

Figure 3 is a fragmentary vertical transverse section, taken along the line 3—3 of Figure 1.

Referring now in detail to the figures, the numeral 1 represents the casing of the mixer, the ends 2 of which are vertical and, as shown, are rectangular affording at their bottom edges stable support for the mixer. The sides 3 and 4 have vertical upper portions 5 and lower convergent portions 6 which merge into a semicylindrical bottom 7, forming a housing for the lower half of a horizontal screw conveyor 8. The casing is divided intermediately by a vertical partition 9, having a closable opening 15 at its bottom, through which the conveyor 8 passes, to chambers thus being formed, a main mixing chamber to the right of the partition and an ante-mixing chamber 11 to the left, as viewed in Figure 1.

The conveyor 8 includes the shaft 12 which passes longitudinally from end to end of the casing and at the lefthand end, as shown, it extends beyond the casing through an intake opening in said end, and through a cylindrical housing 13 which leads to a station or stations, not shown, at which the conveyor picks up the ingredients which are to be mixed and conveys them to the mixer. The shaft 12 is carried in suitable bearings which include the pillow block 14 underlying the conveyor shaft in the plane of the partition 9, and which forms a partial closure for the opening 15.

The opening 15 is closable by means of a gate 16, which is slidable in a vertical plane within channeled guides 17 fixed to the partition 9. The lower end edge of the gate 16 is curved to fit the bottom of the casing and the gate is provided with a recess 18, extending upwardly from the bottom thereof, of such width as to closely embrace the sides of the pillow block, said recess having a curved back end which fits against the shaft 12. The gate 16, when closed, thus cooperates with the pillow block to completely occlude the opening 15. The gate carries a rack bar 24 in mesh with a gear 25 on a shaft 26, which extends to the outside of the casing and terminates in a hand crank for raising or lowering the gate.

In each of the mixing chambers adjacent the middle thereof a conveyor 33 and 34 extends vertically upward substantially to the top of the casing 1. These vertical conveyors have no housings, but depend upon the surrounding mounds for their ability to sustain a column of upwardly moving material. The mounds build progressively from material spilled laterally from the vertical conveyors at progressively higher levels as the height of the mounds increase.

The screw 19 of the conveyor 8 is discontinuous at the foot of each vertical conveyor, being thus divided into four sections. The sections 20 and 21 in the ante-mixing chamber are both pitched in the same direction so as to feed material directly into the main mixing chamber, providing the gate 16 is open. The sections 22 and 23 within the main mixing chamber are oppositely pitched so as to convey material from both ends of the main mixing chamber to the foot of the vertical conveyor in said main mixing chamber. In the latter chamber, there is an opening 27 in the casing adjacent the foot of the vertical conveyor in said chamber, controlled by a gate 28 which overlies a chute 29 for discharging the mixed feed into bags.

A beater shaft 30 is mounted in the upper part of the casing 1, parallel to the bottom conveyor 19. As shown, it is supported by bearings in the end walls of the casing and in the partitions, being at a level below the upper ends of the vertical conveyors. Said shaft is provided with a series of radially extending beaters 31 which are inclined relative to their plane of rotation so as to have a conveying function. The beater shaft 30 also carries a screw or vane 32 which participates in the mixing and in the conveyor action. The screw 32 is discontinuous adjacent the vertical conveyors and at the partition, being therefore, divided into four sections similarly to the vane of the lower conveyor 19. The sections 35 and 36 and the corresponding beaters 31 are oppositely pitched so as to convey the mixed feed in opposite directions toward the anterior end of the casing and the partition 9. Similarly, the sections 37 and 38 and the corresponding beaters are oppositely pitched to convey the mixture in the upper part of the main mixing chamber toward the partition and toward the posterior end of the casing. The bottom conveyor, the beater shaft and the vertical conveyors are synchronously driven by correlated chains and sprockets, and bevel gear sets, as shown, in an obvious manner which need not be described.

In the initial operation, normally the partition gate 16 will be open and the discharge gate 28 closed. There will be an unobstructed passage for material carried by the conveyor 8 from the ante-chamber to the main chamber. There will, consequently, be very little material lifted by the upright conveyor 33. The small amount lifted will fall back forming an inconsequential mound about the foot of said upright conveyor. The material that comes into the main chamber in this phase of operation is substantially unmixed. This material is mixed in the main chamber in the manner described in my hereinbefore mentioned Patent 2,576,177, and is indicated by the arrows in Figure 1, of the present application, the oppositely directed sections of the conveyor cooperating with the upright conveyor 34 to build a mound about said conveyor which grows by accretion both in height and diameter through material spilled upon said mound from the upper helices of said upright conveyor. When the mound is high enough to be stirred by the beaters 31, it becomes more or less flattened by the action of the beaters and more extensive laterally at the top, and when it reaches the spiral vane 32 on the beater shaft, the flights of which move outwardly from the upright conveyor, the movement of the material is divided into two orbits and circulates repetitively as long as may be desired.

When mixed material is to be withdrawn from the mixer, by opening the gate 28, the partition gate 16 is first closed to cut off the feed of substantially unmixed material to the section 22 of the conveyor 8, otherwise, both mixed and unmixed material go out through the discharge gate 28. The two sections 22 and 23 feed toward the open gate 28 and thus affect the discharge of the completely mixed material in the main chamber, or any desired part of it. While this is going on, an entirely different pattern of preliminary mixing is set up through the closing of the gate 16. Since the raw, that is to say, unmixed, material cannot get beyond the gate 16, it begins to pile up against the partition and falls back upon the adjacent section 21 of the conveyor, forming somewhat of a mound or drift against said partition which spreads above the top of the section 21. This section rotates through the material without conveying it anywhere excepting that it increases the mound above it until the mound inundates the lower portion of the upright conveyor 33. The mound then begins to grow just as it did in the main chamber about the upright conveyor as an axis, but not so fast, since only the section 20 of the conveyor 19 is feeding raw material towards said upright conveyor. If the gate 16 remains closed for only a relatively short time, the mound in the ante-chamber will not reach the beaters 31, but there will still be a mixing action, since the section 21 is piling up material against the partition, and the material is gravitating down the inclined side of the mound toward the upright conveyor, where it is lifted and dropped upon the conveyor 19. It is only when the gate is permitted to remain closed for a long period of time, that a mound will build up in the ante-chamber high enough to be beaten and flattened and returned to the opposite walls of said ante-chamber in a manner somewhat similar to what goes on in the main chamber, but not the same, since the mixing action of the section 21 with reference to the partition 9 and closed gate 6 is quite different from the action of the section 28 in the main chamber.

When the discharge gate 28 is closed and the gate 16 opened, the section 21 delivers partially mixed material to the main chamber entrained with raw material delivered to the section 21 by the section 20, until all of the premixed material has entered the main chamber; whereupon, the entire portion of the conveyor within the ante-chamber delivers substantially unmixed material to the main chamber.

The virtue of this arrangement is that the mixing function of the apparatus may be continuous, regardless of the periods of withdrawal of mixed material from the main chamber.

It will be readily understood that since the material introduced into the main mixing chamber is already substantially well mixed, the mixing time in the main mixing chamber may be shortened.

While I have in the above description disclosed a practical embodiment of the invention, it will be understood by those skilled in the art that the specific details of construction and arrangement of parts, as shown, are by way of example and not to be construed as limiting the scope of the invention.

What I claim is:

1. Mixed for feeds and the like, comprising casing means defining a main mixing chamber and an ante-mixing chamber, means providing a passage placing said chambers in intercommunication at the bottom, said casing means being formed with an inlet opening at the bottom of said ante-mixing chamber, a horizontal screw conveyor entering said inlet opening chamber having its shaft extending through both chambers and said passage, the bottoms of said chambers being shaped to form a housing for the lower part of said conveyor, the upper part being open to said chambers, an upstanding conveyor for each chamber at an intermediate point therein, the lower ends of said upstanding conveyors being in operative proximity to said horizontal conveyor, the vane of said horizontal conveyor being discontinuous at said passage and at the foot of each upstanding conveyor, thereby defining pairs of sections of said vane in each of said chambers, the sections in said ante-chamber being pitched in the same direction, to feed toward said passage and the sections in said main chamber being relatively oppositely pitched to feed toward the upright conveyor in said main chamber, said upright conveyors being pitched to feed in an upward direction and being open peripherally to said respective chambers, means providing a gate controlled discharge opening in said casing at the foot of the upright conveyor in said main mixing chamber, and a gate for closing the passage between said chambers.

2. Mixer for foods and the like as claimed in claim 1, said last mentioned gate being positioned between the proximate ends of adjacent sections of said bottom conveyor.

3. Mixer for feeds and the like, as claimed in claim 1, including a horizontal beater shaft at a high level in said casing means extending through both chambers below the upper ends of said upstanding conveyors, radial beater blades carried thereby divided into groups on each side of both upstanding conveyors, the blades of the respective groups in said ante-mixing chamber, and the blades of the respective groups in said main mixing chamber being oppositely pitched to convey material from said respective upstanding conveyors to the opposite ends of said chambers.

4. Mixer for feeds and the like as claimed in claim 1, including a horizontal shaft at high level in said casing means, a conveyor vane on said shaft discontinuous adjacent each upstanding conveyor defining sections at each side of both upstanding conveyors, the sections in each chamber being oppositely pitched to convey material away from said respective upstanding conveyors toward the opposite ends of said chambers, and radial beater blades carried by said shaft divided into groups on each side of both upstanding conveyors, the blades of the respective groups in the ante-mixing chamber and the blades of the respective groups in said main mixing chamber being oppositely pitched to convey material away from the respective upstanding conveyors toward the opposite ends of said chambers.

References Cited in the file of this patent

UNITED STATES PATENTS

| | | |
|---|---|---|
| 803,945 | Weinrich | Nov. 7, 1905 |
| 2,081,850 | Darby et al. | May 25, 1937 |
| 2,576,177 | Herr | Nov. 27, 1951 |